Dec. 11, 1951          J. R. MILES          2,578,574

OPTICAL SYSTEM FOR VARIABLE POWER GALILEAN TELESCOPES

Filed May 12, 1948

John R. Miles
INVENTOR.

Patented Dec. 11, 1951

2,578,574

UNITED STATES PATENT OFFICE 2,578,574

OPTICAL SYSTEM FOR VARIABLE POWER GALILEAN TELESCOPES

John R. Miles, Maine Township, Cook County, Ill., assignor to La Croix Optical Company, Chicago, Ill., a corporation of Illinois Application May 12, 1948, Serial No. 26,565

4 Claims. (Cl. 88—57)

The present invention relates generally to optical devices, and more particularly to improvements in optical devices, such as telescopes, viewfinders, or the like, having a magnification less than unity.

Heretofore, in the manufacture of optical instruments, such as telescopes, viewfinders, or the like, having a magnification less than unity, when a variable power Galilean telescope was built, the movement of a certain lens or combination of lenses produced a variation in focus, when the movement of said certain lens or combination of lenses was made to accomplish a variation in magnification, and, although it has been the practice to move a negative lens, or combination of negative lenses in a position more or less intermediate between the front positive lens and rear positive lens, this movement produced the variation in focus referred to above. Also in these telescopes which had said means for producing an appreciable variation in magnification, and consequently a variation in field, the magnification itself varied between limits which were numerically quite low, particularly when used as a viewfinder for cameras and the like, which is the primary use for most telescopes of this type.

Accordingly, it is an object of the present invention to provide a novel means whereby a variable power Galilean telescope can be produced, which has a great range of magnification, and also has this range of magnification numerically substantially greater than one-fourth in all parts of the range of variation of magnification.

Another and more specific object is to provide a novel optical system, comprising a front positive lens member of long focal length, a second negative lens member, or combination of lens members of short focal length, and a pair of lens members located towards the rear of the system, with the first of said pair of lens members at the rear being a positive lens, and the second being a negative lens, whereby said pair produces a telescope within itself, whereby the image received from the front said two lens members is magnified, so that the final magnification of the complete telescope is increased.

Another specific object is to provide a novel optical system for telescopes, or the like, in which an intermediate negative member, or combination of negative members, and a rear telescopic pair of members, are moved together away from a long focal length positive front member, thereby changing the magnification of the complete telescope system without appreciably changing the focus or required accommodation, where accommodation is understood to mean the change of focus required in the human eye, while the telescope is being used.

The above and other objects and advantages of the present invention will appear more fully hereinafter, from a consideration of the detailed description and claims which follow, taken together with the accompanying drawings, wherein one embodiment of the invention is illustrated. It is to be expressly understood, however, that the drawings are for the purpose of illustration only, and not designed as a definition of the limits of the invention. Reference for this latter purpose should be had to the appended claims.

In the drawings wherein like reference characters refer to like parts throughout both views, Figure 1 is a side axial section view of the optical system construction, with the movable lens members at their farthest position to the front.

In all three figures, the edge principal rays at the top and bottom limits of the field are shown.

Figure 1:
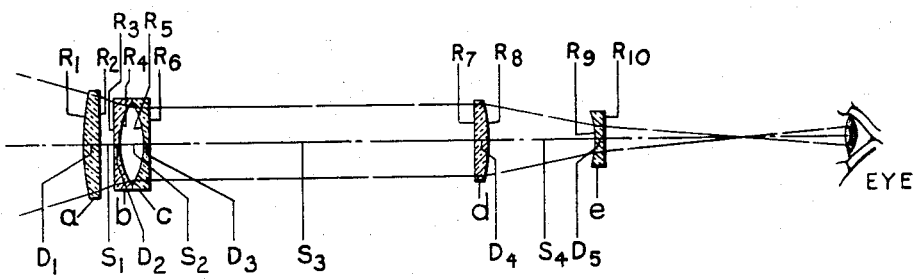
Figure 2:
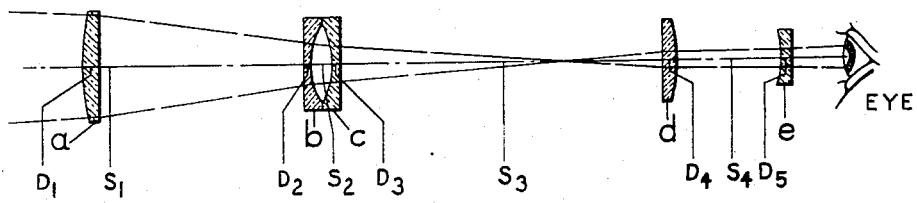
Figure 2 is a side axial section view of the optical system construction with the movable lens members at their farthest position to the rear.

The one embodiment illustrated includes a plano-convex front element $a$; two plano-concave elements $b$ and $c$, comprising the intermediate negative member; a plano-convex element $d$, and a plano-concave rear element $e$, comprising the internal telescopic unit A. In Figures 1 and 2 the elements $b$, $c$, $d$ and $e$ move together to produce the said change in magnification and field. All of said elements designed and shaped according to the following formula, taking the unit as e. g., 1 millimeter:

| Radius of Curvature | Thickness and Separation | Refractive Index, $N_D$ | V |
|---|---|---|---|
| $R_1 = +33.43$ | $D_1 = 1.9$ | $a = 1.52$ | 59.0 |
| $R_2 = $ Inf. | $S_1 = 2.0$ | | |
| $R_3 = $ Inf. | $D_2 = 1.3$ | $b = 1.52$ | 59.0 |
| $R_4 = +13.52$ | $S_2 = 1.9$ | | |
| $R_5 = -13.52$ | $D_3 = 1.3$ | $c = 1.52$ | 59.0 |
| $R_6 = $ Inf. | $S_3 = 60.19$ | | |
| $R_7 = $ Inf. | $D_4 = 1.9$ | $d = 1.52$ | 59.0 |
| $R_8 = -16.91$ | $S_4 = 16.5$ | | |
| $R_9 = -18.84$ | $D_5 = 1.5$ | $e = 1.52$ | 59.0 |
| $R_{10} = $ Inf. | | | |

In the production of variation of magnification, $S_1$ is increased from 2.0 to 29.8 with the range of magnification from .31 to .77, and a corresponding variation in field of view from 32.6° to 5.8°, while $S_2$, $S_3$ and $S_4$ remain the same.

The functions of the parts

Lens element $a$ serves two main functions, as follows:
1. To refract the edge principal ray downward, to be affected more greatly by the movement of the two lens elements $b$ and $c$.
2. To produce a convergence of the parallel bundle of light in order to partially compensate for the divergence produced by elements $b$ and $c$.

Lens elements $b$ and $c$ together serve two main functions, as follows:
1. To refract the edge principal ray so that it becomes approximately parallel to the axis.
2. To produce a greater divergence of the originally parallel bundle.

Lens element $d$ serves three main functions, as follows:
1. To refract the edge principal ray towards the axis and approximately towards the location of the eye.
2. To serve as objective for the internal modified telescope unit.
3. To produce a convergence to partially compensate for the divergence produced by the combination of elements $b$, $c$ and $e$.

Lens element $e$ serves three main functions, as follows:
1. To refract the edge principal ray directly into the eye.
2. To serve as eyepiece for the internal modified telescope unit.
3. To bring the originally parallel bundle back to parallelism.

Figure 3:
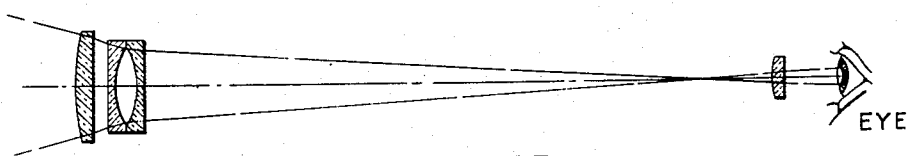
Figure 3 illustrates the prior art in which the magnification is less, and the accommodation range is greater, than in the embodiment shown in Figures 1 and 2.

There is thus produced a novel optical system for telescopes, view-finders or the like, which has a variable magnification and variable field of view, and at the same time very little difference of accommodation required, and a magnification which is higher numerically than the systems used in prior art for similar purposes. These systems in prior art were composed, as shown in Figure 3, of a positive front lens, a negative lens, a pair of negative intermediate lenses, and a positive rear lens. The movement of this negative lens, or pair of negative intermediate lenses, produced, along with a variable field size, a change in the accommodation required, which was so great that even for limited variation in field size, the change in accommodation was such that more elderly individuals were unable to use the system, because of their inability to accommodate. This system, in prior art, also produced a low numerical magnification, considerably less than unity, which made it difficult to see the subject viewed in the system.

I claim:

1. An optical system for variable magnification telescopes, view-finders, or the like, having a magnification range substantially between .3X and .8X, and an accommodation range substantially between two diopters and .4 diopters, comprising five lens elements, the first of which is convex-plano, and has a focal length approximately .66 times the overall length of the system, when set for lowest magnification, and the second lens element is plano-concave, with a focal length approximately .27 times the overall length of the system, when set for lowest magnification, and the third element is concave-plano, and has a focal length approximately .27 times the overall length of the system, when set for lowest magnification, and the fourth element is plano-convex, and has a focal length approximately .33 times the overall length of the system, when set for lowest magnification, and the fifth element is concave-plano, and has a focal length approximately .37 times the overall length of the system, when set for lowest magnification, in which the order of the description of the shape of the elements indicates their orientation in the system, and in which the separations of the elements are approximately as follows: Separation of the first element and the second element variable between approximately one forty-eighth of the overall length of the system, when set for lowest magnification, and one-third of the overall length of the system, when set for highest magnification, and the separation of the second element and the third element approximately one forty-eighth of the overall length of the system, when set for lowest magnification; separation of the third element and the fourth element approximately six-tenths of the overall length of the system, when set for lowest magnification, and the separation of the fourth element and the fifth element approximately one-sixth of the overall length of the system, when set for lowest magnification.

2. An optical system for variable magnification telescopes, view-finders, or the like, comprising a plurality of lenses in axial alignment, substantially according to the following table,

| Radius of Curvature | Thickness and Separation | Refractive Index, $N_D$ | V |
|---|---|---|---|
| $R_1 = +33.43$ | $D_1 = 1.9$ | $a = 1.52$ | 59.0 |
| $R_2 = $ Inf. | $S_1 = 2.0$ | | |
| $R_3 = $ Inf. | $D_2 = 1.3$ | $b = 1.52$ | 59.0 |
| $R_4 = +13.52$ | $S_2 = 1.9$ | | |
| $R_5 = -13.52$ | $D_3 = 1.3$ | $c = 1.52$ | 59.0 |
| $R_6 = $ Inf. | $S_3 = 60.19$ | | |
| $R_7 = $ Inf. | $D_4 = 1.9$ | $d = 1.52$ | 59.0 |
| $R_8 = -16.91$ | $S_4 = 16.5$ | | |
| $R_9 = -18.84$ | $D_5 = 1.5$ | $e = 1.52$ | 59.0 |
| $R_{10} = $ Inf. | | | | in which $a$, $b$, $c$, $d$ and $e$ represent the lenses, and $R_1$, $R_2$, $R_3$, $R_4$, $R_5$, $R_6$, $R_7$, $R_8$, $R_9$ and $R_{10}$ represent the radii of curvature of the individual lenses, and in which $D_1$, $D_2$, $D_3$, $D_4$ and $D_5$ represent the thicknesses of these lenses, and in which $S_1$, $S_2$, $S_3$ and $S_4$ represent the separations of the lenses, and in which the refractive index $N_D$ is the index of refraction of the glasses used in the respective lenses in sodium light, and V is the reciprocal dispersion ratio commonly found in optical glass catalogues, and in which the magnification of the system varies approximately between .3X and .8X, and the accommodation required by the eye varies approximately between 2 and .4, and in which the second, third, fourth and fifth lenses move together by a distance of approximately 28 units, and in which the field of view of the system varies approximately between 32.6° and 5.8°.

3. An optical system for variable magnification telescopes, viewfinders, or the like, having a magnification range substantially between $\frac{1}{10}$ and $\tfrac{1}{10}$, and an accommodation range substantially between 2 diopters and $\tfrac{1}{10}$ diopters, comprising at least 4 lens units, in which the first principal lens unit has a positive focal length between $\tfrac{1}{10}$ and $\tfrac{5}{10}$ of the overall functional length of the system, and in which the second principal lens unit has a negative focal length between $\tfrac{1}{5}$ and $\tfrac{1}{7}$ of the overall functional length of the system, and in which the third principal lens unit has a positive focal length between $\tfrac{4}{10}$ and $\tfrac{5}{10}$ of the overall functional length of the instrument, and in which the fourth principal lens unit has a negative focal length between $\tfrac{7}{10}$ and $\tfrac{5}{10}$ of the overall functional length of the instrument, and in which the separation of the first principal lens unit and the second principal lens unit is between $\tfrac{1}{100}$ and $\tfrac{1}{20}$ of the overall functional length of the instrument when set for lowest magnification, and in which the separation of the second principal lens unit and third principal lens unit is between $\tfrac{7}{10}$ and $\tfrac{8}{10}$ the overall functional length of the instrument when set for lowest magnification, and in which the separation of the third principal lens unit and the fourth principal lens unit is between $\tfrac{1}{8}$ and $\tfrac{1}{3}$ the overall functional length of the instrument when set for lowest magnification.

4. An optical system for variable magnification telescopes, viewfinders, or the like, having a magnification range substantially between $\tfrac{2}{10}$ and $\tfrac{1}{10}$, and an accommodation range substantially between 2 diopters and $\tfrac{1}{10}$ diopters, comprising at least 4 lens units, in which the first principal lens unit has a positive focal length between $\tfrac{5}{10}$ and $\tfrac{1}{10}$ of the overall functional length of the system, and in which the second principal lens unit has a negative focal length between $\tfrac{1}{4}$ and $\tfrac{1}{8}$ of the overall functional length of the system, and in which the third principal lens unit has a positive focal length between $\tfrac{1}{10}$ and $\tfrac{1}{10}$ of the overall functional length of the instrument, and in which the fourth principal lens unit has a positive focal length between $\tfrac{1}{10}$ and $\tfrac{1}{10}$ of the overall functional length of the instrument, and in which the separation of the first principal lens unit and the second principal lens unit is between $\tfrac{1}{1000}$ and $\tfrac{1}{10}$ of the overall functional length of the instrument when set for lowest magnification, and in which the separation of the second principal lens unit and third principal lens unit is between $\tfrac{1}{10}$ and $\tfrac{1}{10}$ the overall functional length of the instrument when set for lowest magnification, and in which the separation of the third principal lens unit and the fourth principal lens unit is between $\tfrac{1}{5}$ and $\tfrac{1}{9}$ the overall functional length of the instrument when set for lowest magnification.

JOHN R. MILES.

REFERENCES CITED

The following references are of record in the file of this patent:

UNITED STATES PATENTS

| Number | Name | Date |
|---|---|---|
| 1,236,722 | Lange | Aug. 14, 1917 |
| 1,553,211 | Barr et al. | Sept. 8, 1925 |
| 2,206,382 | Zimmermann | July 2, 1940 |
| 2,353,565 | Kaprelian | July 11, 1944 |

FOREIGN PATENTS

| Number | Country | Date |
|---|---|---|
| 881,337 | France | Jan. 22, 1943 |